Patented Nov. 20, 1934

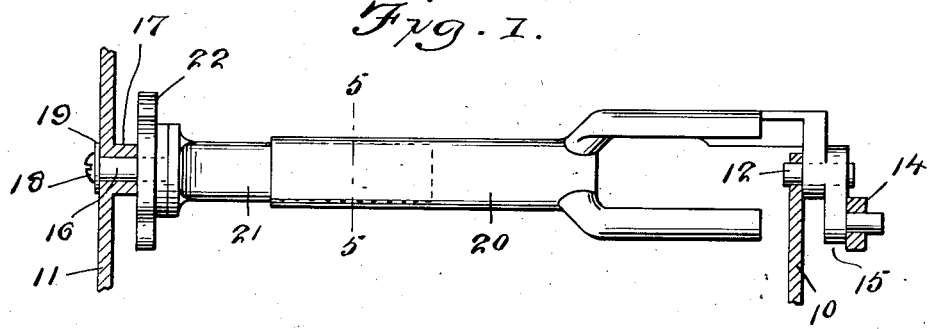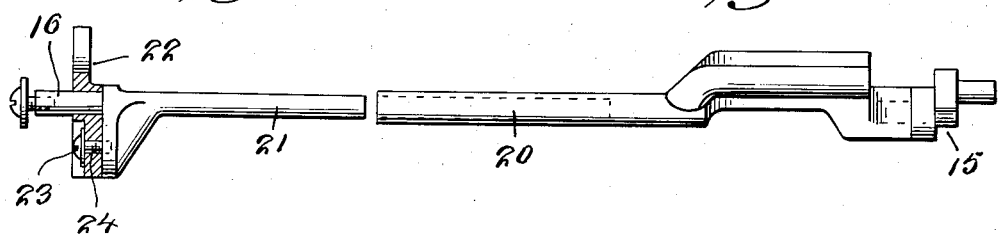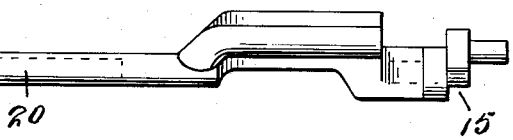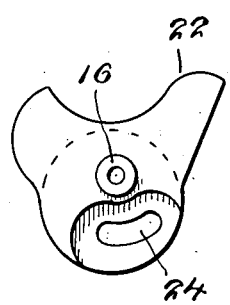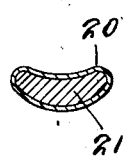

1,981,762

UNITED STATES PATENT OFFICE 1,981,762

MAGAZINE CRADLE

Ulysse Tremblay, Lawrence, Mass.

Application September 28, 1932, Serial No. 635,285

2 Claims. (Cl. 139—245)

The object of the invention is to provide a magazine cradle particularly adapted for magazine looms and will make unnecessary the changing of the cradle in adjusting the size of the magazine to the requirements of different lengths of bobbins; to provide a cradle which is longitudinally extensible and contractable and provided with mounting means, so that when the size of the magazine is varied, automatic extension or reduction in length of the cradle will be effected; and generally to provide a magazine cradle which is of simple form and susceptible of cheap manufacture.

With this object in view, the invention consists in a construction and combination of parts of which a preferred embodiment is illustrated in the accompanying drawing but to which embodiment the invention is not to be restricted. Continued use in practice may dictate certain changes or alterations and the right is claimed to make any which fall within the scope of the annexed claims.

In the drawing:

Figure 1 is a plan view of a cradle constructed in accordance with the invention.

Figure 2 is an edge elevational view of that end of the cradle supported by the outer wall of the magazine.

Figure 3 is a corresponding view of the opposite end of the cradle.

Figure 4 is an elevational view of the bobbin throw-off.

Figure 5 is a sectional view on the plane indicated by the line 5—5 of Figure 1.

Since the invention resides in so constructing the cradle that its length or size will be varied automatically in the variation of the size of the magazine, it is unnecessary to do further than to illustrate the cradle, showing the latter mounted in the forward and back walls 10 and 11 of the magazine, the latter wall being adjustable toward and away from the former wall to vary the size of the magazine to suit the lengths of the particular bobbins being handled. The cradle has a pivotal mounting 12 in the forward wall and is rocked by the link 14 connected with the wrist pin of the crank 15. The remote end of the cradle is mounted in the rear wall by means of a journal 16 passing through a bearing 17 in the rear wall, the journal being axially bored and tapped for the reception of a screw 18 which, bearing against the washer 19, secures the washer to the end of the journal. The washer is of larger diameter than the journal and consequently will bear against the outer face of the rear wall 11, so that if there is to be any adjustment of the rear wall toward or away from the front wall 10, the screw must be released or the length of the cradle may be varied to suit the adjustment. The invention contemplates the variation in the length of the cradle and to this end it is formed in two sections 20 and 21, of which the former is hollow and the latter is telescoped into it, the fit of the section 21 in the section 20 being snug but not tight enough to make for any binding action in extending or reducing the length of the cradle.

The bobbin throw-off 22 is of the conventional form, being mounted on the journal 17 and provided with a screw and slot connection 23—24 with the cradle to permit relative angular movement of the two.

If the magazine is to be reduced to accommodate bobbins of reduced length, the adjustment of the rear wall 11 is attended with a reduction in the length of the cradle by reason of the telescoping connection of its sections. Similarly an outward adjustment of the rear wall 11 to increase the size of the magazine is attended with an increase in length of the cradle, since the section 21, while it may rotate freely with reference to the wall 11, is precluded from axial movement relative thereto by reason of the screw and washer connection 18—19.

The invention having been described, what is claimed as new and useful is:

1. In combination with the magazine of a loom having a fixed wall and an oppositely disposed adjustable wall for varying the size of the magazine, a cradle journaled in said walls and automatically adjustable as to length when said adjustable wall is adjusted, said cradle comprising telescopically connected sections.

2. In combination with the magazine of a loom having a fixed wall and an oppositely disposed adjustable wall for varying the size of the magazine, a cradle journaled in said walls and automatically adjustable as to length when said adjustable wall is adjusted, said cradle comprising telescopically connected sections of which that section journaled in the adjustable wall is angularly but not axially movable.

ULYSSE TREMBLAY.